United States Patent
Wang et al.

(10) Patent No.: US 7,002,885 B2
(45) Date of Patent: Feb. 21, 2006

(54) METHOD FOR DETERMINING AN OPTICAL WRITE POWER AND AN OPTICAL DISC ACCESS SYSTEM USING THE SAME

(75) Inventors: Wai W. Wang, Taoyuan (TW); Tso-Tsai Chen, Taipei (TW); Mason Yen, Taipei (TW)

(73) Assignee: Benq Corporation, Taoyuan (TW)

( * ) Notice: Subject to any disclaimer, the term of this patent is extended or adjusted under 35 U.S.C. 154(b) by 448 days.

(21) Appl. No.: 10/262,686

(22) Filed: Oct. 1, 2002

(65) Prior Publication Data
US 2003/0063536 A1  Apr. 3, 2003

(30) Foreign Application Priority Data
Oct. 2, 2001  (TW) .............................. 90124267 A

(51) Int. Cl.
*G11B 7/007* (2006.01)
(52) U.S. Cl. ................... 369/47.53; 369/47.4
(58) Field of Classification Search ............ 369/47.53, 369/47.3, 47.49, 53.3, 47.39, 47.4, 47.41, 369/53.37
See application file for complete search history.

(56) References Cited

U.S. PATENT DOCUMENTS

| | | | | |
|---|---|---|---|---|
| 6,052,347 A | * | 4/2000 | Miyata .................... | 369/47.53 |
| 6,061,316 A | * | 5/2000 | Nakamura et al. ........ | 369/47.53 |
| 6,418,102 B1 | * | 7/2002 | Suga ....................... | 369/47.53 |
| 6,728,177 B1 | * | 4/2004 | Seong et al. ............... | 369/47.4 |
| 6,842,412 B1 | * | 1/2005 | Ushiyama et al. ....... | 369/47.53 |
| 2002/0003760 A1 | * | 1/2002 | Honda .................... | 369/47.52 |

\* cited by examiner

*Primary Examiner*—Brian E. Miller
*Assistant Examiner*—Michael V. Battaglia
(74) *Attorney, Agent, or Firm*—Ladas & Parry LLP

(57) ABSTRACT

A method for determining an optical write power and an optical disc access system using the same. In addition to a typical Inner Power Calibration Area, the method includes an Outer (second) Power Calibration Area implementation on the outer area of a Readable/Writable Optical disc with a constant linear velocity (CLV) format; when a data writing speed selected by a user causes a rotation speed required by an optical power calibration on an Inner (first) Power Calibration Area of the disc greater than an Optical Power Calibration (OPC) limit, the optical disc access system uses a lower rotation speed for the optical power calibration on the Outer Power Calibration Area to ensure the accuracy of the power calibration.

12 Claims, 3 Drawing Sheets

METHOD FOR DETERMINING AN OPTICAL WRITE POWER AND AN OPTICAL DISC ACCESS SYSTEM USING THE SAME

BACKGROUND OF THE INVENTION

1. Field of the Invention

The invention relates to a method for determining an optical write power. In addition to a prior Inner Power Calibration Area, the method includes an Outer Power Calibration Area implementation on the outer area of a Readable/Writable Optical disc with a constant linear velocity (CLV) format and chooses the Inner Power Calibration Area or the Outer Power Calibration Area to calibrate the write power to ensure its accuracy.

2. Description of the Related Art

With the advance of electronics techniques and relative costing down, optical storage devices, for example, CD-R/CD-RW drives and the like, are widely used in computer systems and have increasingly become a standard peripheral. Generally, such drives perform an optical power calibration before data is written. The optical power calibration essentially pre-writes specific data to an Inner Power Calibration Area on an optical disc and reads it out to detect the feature of the optical disc, thereby determining the required write power to ensure the data is written into the optical disc properly.

FIG. 1 is a schematically lateral cross-section of a typical optical disc 10. The typical optical disc 10 includes a center 12, a power calibration area 14, a data storage area 16 and a last possible lead-out area 18. The area 14 is located on the inner area of the disc 10 (i.e., the outer area of the center 12) for an optical power calibration; the area 18 is located on the outer area (or the outer edge) of the disc 10 to record a data-end message of the disc 10; the area 16 is located between the areas 14 and 18 for a user data record.

For an optical disc with a CLV format, for example, Optical disc Write Once (CD-WO) and the like, a relative motion velocity of an optical head of an optical disc drive to an optical disc is kept at a constant velocity when data is written or read, regardless of the read/write position (i.e., a radius of the optical head on the optical disc) on the optical disc.

FIG. 2 is a diagram of two angular velocity-to-radius (W-R) curves of a optical disc with CLV format. FIG. 3 is a diagram of two linear velocity-to-radius (V-R) curves of the optical disc with CLV format.

When a lower linear velocity $V_1$ is used to read/write data from/to an optical disc with CLV format, an angular velocity-to radius (W-R) curve $CLV_1$ is shown in FIG. 2, wherein the angular velocity W is rotation speed of a servomotor in a CD drive and the radius R corresponds to the optical disc with CLV format. Due to the feature of constant linear velocity (CLV) in the optical disc with CLV format, the rotation speed (angular velocity) of the servomotor has to be increased as the radius to be written to (or read from) the optical disc is reduced (FIG. 2), in order to maintain the CLV write (or read) in any position of the optical disc. For example, when data on an outer area (such as at the position of radius $R_2$) of the optical disc is written or read, the required angular velocity is $W_2$. As well, when data on an inner area (such as at the position of radius $R_1$) of the optical disc is written or read, the required angular velocity is $W_1$ to keep the CLV ($V_1$), wherein $W_1 > W_2$.

As cited above, the typical power calibration is performed only in the Power Calibration Area. Because the Power Calibration Area is located on the inner area (where the accurate position has a radius $R_{PC}$ smaller than $R_1$), the optical disc has to be provided with a higher angular velocity Wpcl to keep the same CLV (such as 12×) during the power calibration on the Power Calibration Area.

Basically, the design limit of an optical drive mechanism is increasingly reached as the rotation speed of the optical disc drive servomotor gets higher and higher. This increases vibration and further reduces power calibration reproducibility at high speeds, leading to errors. Generally, in the design practice of the optical disc drive, when a rotation speed (i.e. the angular velocity W of optical disc) exceeds a limit, the power calibration reliability cannot be obtained in the Power Calibration Area. The limit is referred to as an Optical Power Calibration (OPC limit) limit.

The OPC limit in FIG. 2 is $W_L$. Upon the optical disc access at $V_1$, the power calibration is not affected because the required rotation speed thereof is still smaller than the limit $W_L$.

When a higher CLV $V_2$ (such as 24×, i.e. an access velocity of 3600KB/sec) as shown in the curve $CLV_2$ of FIGS. 2 and 3 is chosen, the required rotation speed for the power calibration in the Power Calibration Area (at the position of radius $R_{PC}$) is increased to the velocity $W_{PC2}$. Because the velocity $W_{PC2}$ exceeds the limit $W_L$, the power calibration may result in the increasing possibility of error. Thus, the optical disc drive is not able to perform the power calibration at $V_2$ and provide some functions, for example a write choice at $V_2$.

SUMMARY OF THE INVENTION

Accordingly, an object of the invention is to provide a method for determining an optical write power. In addition to a typical Inner Power Calibration Area, the method adds an Outer (second) Power Calibration Area implementation on the outer area of a CD-R/W with a constant linear velocity (CLV) format. The method determines a first rotation speed according to a data writing speed $V_2$ selected by a user. When an optical disc access system rotates the CD-R/W according to the first rotation speed, the optical disc access system writes data into an Inner (first) Power Calibration Area at $V_2$. When the first rotation speed required for a power calibration on the first Power Calibration Area exceeds an Optical Power Calibration (OPC) limit, the power calibration on the Outer Power Calibration Area is performed at a lower rotation speed to ensure the accuracy of the power calibration, so as to allow a CD-R/W drive capable of operating at $V_2$ that is a higher data writing speed. The lower rotation speed is referred to as a second rotation speed.

Another object of the invention is to provide an optical disc access system, which uses the inventive method to ensure the accuracy of the power calibration.

To achieve the cited objects, the invention provides a method for determining an optical write power, suitable for an optical disc with a CLV data write function. The method includes: (a) defining a first power calibration area and a second power calibration area respectively to the inner area and the outer area of the optical disc, and a data storage area between the first power calibration and the second power calibration; (b) choosing a data writing speed for data being written to the data storage area; (c) according to the data writing speed, determining a first rotation speed for the optical disc in order to write CLV data to the first power calibration area; (d) performing a write power calibration on the second power calibration area when the first rotation speed exceeds a first rotation speed limit and otherwise on the first power calibration area; and (e) according to the result of the write power calibration, determining the optical write power required upon the data writing speed with respect to an optical disc write.

To achieve the cited objects, the invention provides an optical disc access system, including: an access device to write data to an optical disc using the CLV format, the optical disc defining a first power calibration area and a second power calibration area respectively to the inner area and the outer area of the optical disc, and a data storage area between the first power calibration and the second power calibration; and a control device to determine the optical write power to be written in data to the optical disc and control an operation of the optical disc access system. According to the data writing speed chosen, the control device gets a first rotation speed required by the optical disc when the inner area of the data storage area is written in data at CLV. When the first rotation speed exceeds the first rotation speed limit, the control device performs the write power calibration on the second power calibration area. Otherwise, the control device performs the write power calibration on the first power calibration area.

The first rotation speed limit is the highest rotation speed of the optical disc that can properly perform the power calibration on the first power calibration area.

BRIEF DESCRIPTION OF THE DRAWINGS

The invention can be more fully understood by reading the subsequent detailed description in conjunction with the examples and references made to the accompanying drawings, wherein.

DETAILED DESCRIPTION OF THE PREFERRED EMBODIMENT

Figure 4:
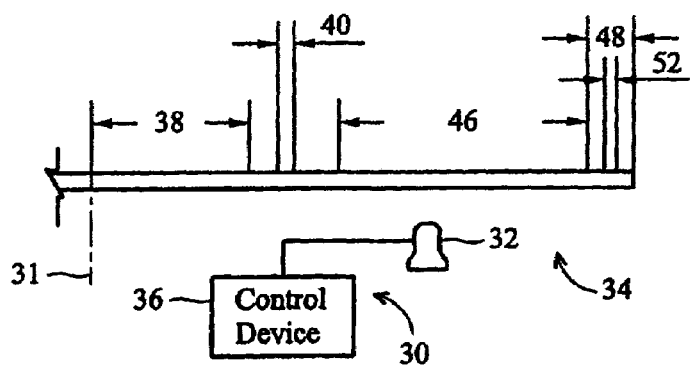
FIG. 4 is a schematic diagram of an optical disc access system according to the invention.

FIG. 4 is a schematic diagram of an optical disc access system 30 according to the invention. In FIG. 4, the optical disc access system 30 includes: an access device 32 to write data to an optical disc 34 using the CLV format; and a control device 36 to determine an optical write power to the optical disc 34 to be written in data and control the operation of the system 30.

As shown in FIG. 4, the disc 34 is round and symmetric to a center axis 31. The disc 34 includes a center 38, a Inner Power Calibration Area 40, a Data Record (storage) Area 46 and a last possible Lead-out Area 48. The Area 40 is implemented in the inner area (i.e. located on the outer lateral of the center 38) of the disc 34 to perform an optical power calibration. The Area 48 is implemented in the outer area (or outer edge) of the disc 34 to record a data-end message of the disc 34. The Area 46 is implemented between the Areas 40 and 48 to record data written by a user. It is noted that in order to carry out the invention, an Outer Power Calibration Area 52 is implemented in the Area 48 of the disc 34.

Accordingly, when the disc 34 performs a data write at CLV, the control device 36 calculates a first rotation speed required by a servomotor of the system 30 according to a data writing speed chosen by a user in case of a write power calibration performing on the Area 40 and maintaining at the data writing speed. When the first rotation speed exceeds a first rotation speed limit (for example, the Optical Power Calibration (OPC) limit), the control device 36 changes the write power calibration onto the Area 53; otherwise the control device maintains the write power calibration on the Area 40.

The inventive method for determining an optical write power is suitable for an optical disc 34 with a CLV data write function. Further, as shown in FIG. 4, in addition to the Inner Power Calibration Area 40 implemented on the disc 34, an Outer Power Calibration Area 52 is implemented on the last possible Lead-out Area 48 of the disc 34.

Figure 5:
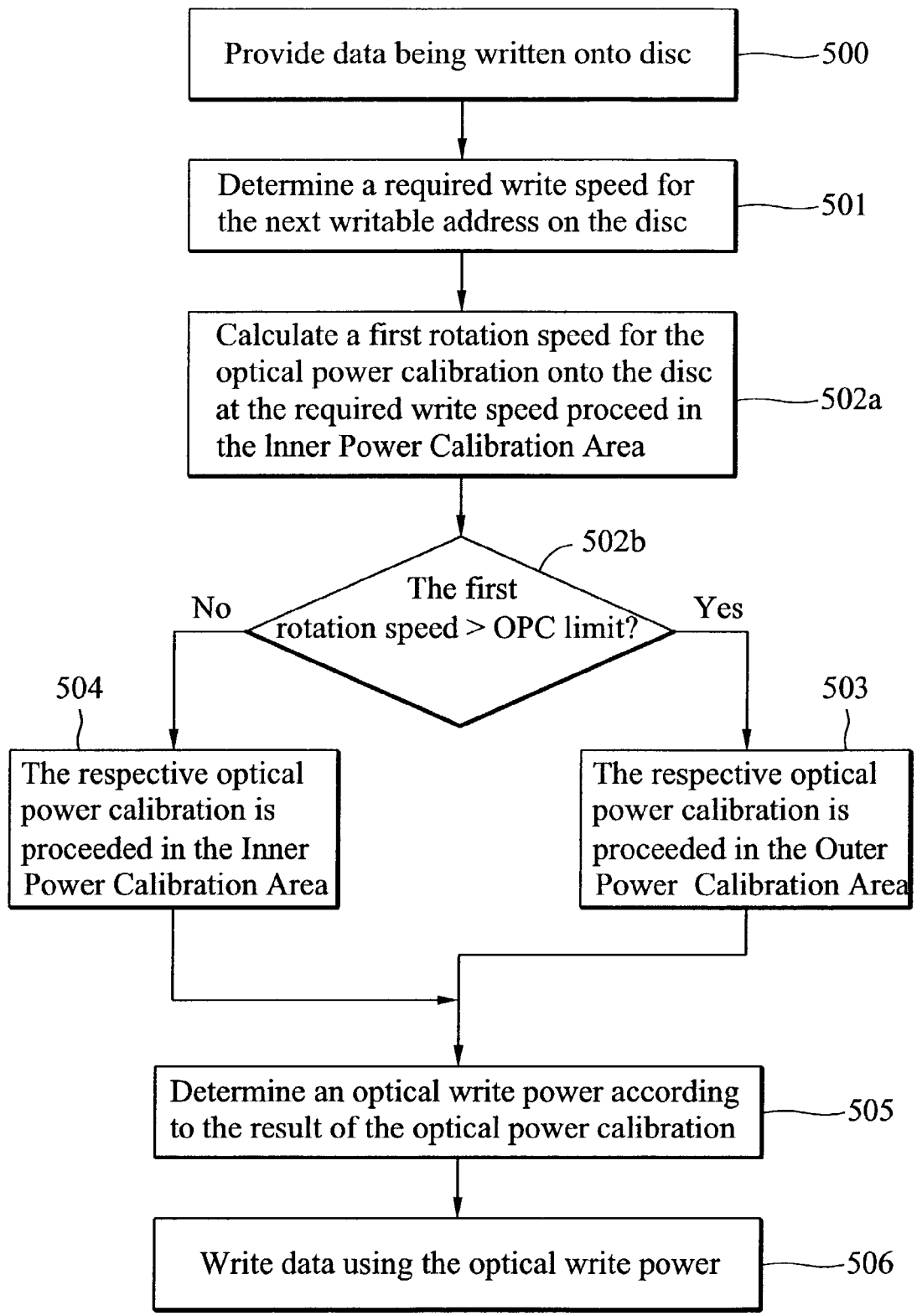
FIG. 5 is a flowchart of a data write using a method for determining an optical write power according to the invention.

FIG. 5 is a flowchart of a data write using a method for determining an optical write power according to the invention, showing Step 500, in which data is written to disc.

In Step 501, a required data writing speed, for example 4×, 8×, . . . , 24×, is determined for the next writable address on the disc. In this case, it is provided that a data writing speed is 24×, i.e., 3600 KB/sec.

In Step 502a, a first rotation speed is calculated for the optical power calibration onto the disc at the required 24× data writing speed (3600 KB/sec) proceeding in the Inner Power Calibration Area 40. Therefore, the access system 30 has to rotate the disc 34 up to the first rotation speed calculated.

Step 502b determines whether the first rotation speed exceeds an OPC limit. The OPC limit can be the highest rotation speed of the servomotor of the access system 30, wherein the highest rotation speed can effectively eliminate the disc vibration or properly perform the optical power calibration to obtain a preferred "reproducibility" for the optical power calibration.

In Step 503, when the first rotation speed exceeds the OPC limit, the optical power calibration (for write) is changed to Area 52, and in Step 504, when the first rotation speed does not exceed the OPC limit, the optical power calibration (for write) is maintained on the Area 40.

In Step 505, an optimum write power is determined according to the result of the optical power calibration (i.e. the write power calibration).

Finally, in Step 506, data is written using the optimum write power.

Figure 1:
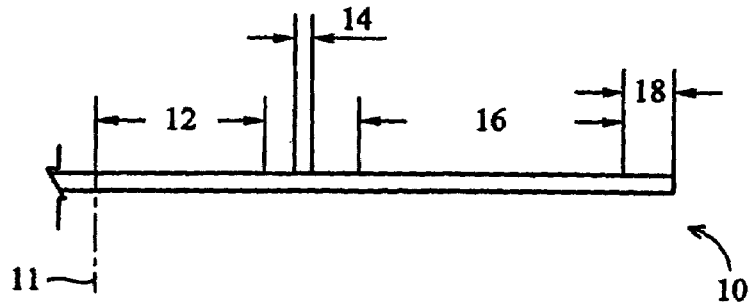
FIG. 1 is a schematically lateral cross-section of a typical optical disc.
Figure 2:
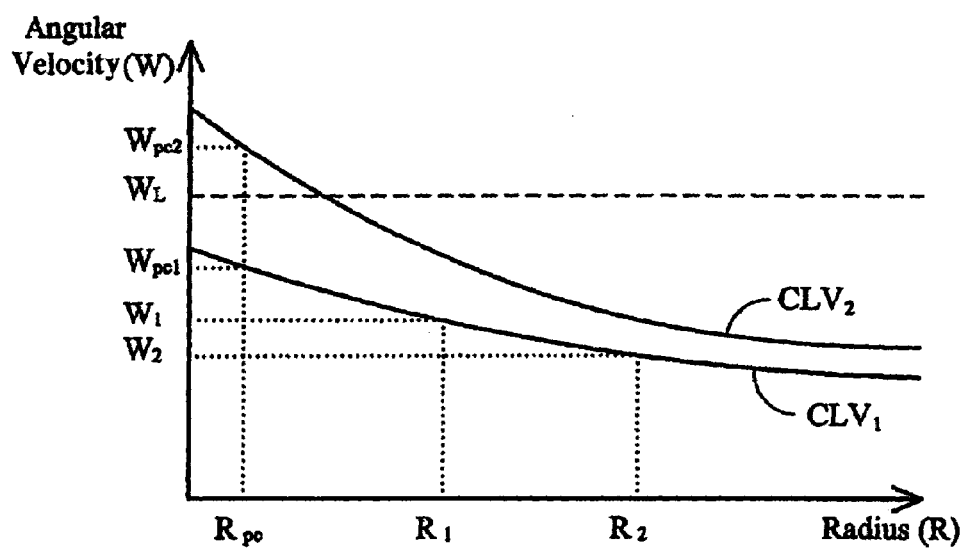
FIG. 2 is a diagram of two angular velocity-to-radius (W-R) curves of an optical disc with CLV format.
Figure 3:
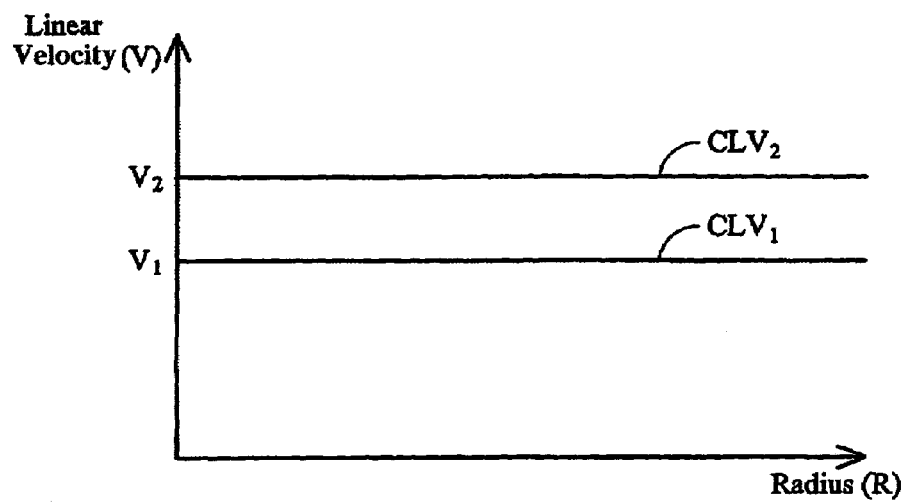
FIG. 3 is a diagram of two linear velocity-to-radius (V-R) curves of the optical disc with CLV format.

As shown in FIGS. 2 and 3, when a user chooses a data writing speed $V_1$ (for example, 12×), the power calibration is performed on the Inner Power Calibration Area 40 to write data to the disc 34 at 12× since the first rotation speed $W_{PC1}$ required by the disc 34 does not exceed the OPC limit.

"When the user chooses a data writing speed $V_2$ (for example, 24×), the power calibration is performed on the Outer Power Calibration Area 52 at a lower rotation speed to write data to the disc 34 at 24×, since the first rotation speed $W_{PC2}$ required by the disc 34 does not exceed the OPC limit, so as to ensure the accuracy of the power calibration."

The inventive power calibration is adapted for not only CD-R and CD-RW but also other optical recording/storage media such as DVD-R, DVD-RW, DVD+RW and others.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for determining an optical write power for writing data onto an optical disc at a data writing speed, said method comprising the steps of:
    defining a first power calibration area and a second power calibration area on the inner area and the outer area of the optical disc respectively;
    defining a data storage area between the first power calibration area and the second power calibration area;
    determining a first rotation speed for the optical disc in order to perform power calibration by writing the data onto the first power calibration area according to the data writing speed; and
    performing a write power calibration on the second power calibration area when the first rotation speed exceeds a first rotation speed limit, otherwise performing the write power calibration on the first power calibration area when the first rotation speed is lower than the first rotation speed limit.

2. The method as claimed in claim 1, wherein the first rotation speed limit is the highest rotation speed of the optical disc for the write power calibration to be properly performed on the first power calibration area.

3. The method as claimed in claim 1, wherein the second power calibration area is implemented in a Lead-Out Area of the outer area of the optical disc.

4. The method as claimed in claim 3, wherein the Lead-Out Area is located in the outer edge of the optical disc to record a data-end message of the optical disc.

5. An optical disc access system, comprising:
    an access device, to write data to an optical disc using CLV format, a first power calibration area and a second power calibration area defined on the inner area and the outer area of the optical disc respectively, and a data storage area defined between the first power calibration area and the second power calibration area; and
    a control device, to determine an optical write power for writing in data onto the optical disc and control an operation of the optical disc access system,
    wherein the control device determines a first rotation speed required by the optical disc to perform a power calibration by writing a data onto the first power calibration area at a data writing speed;
    wherein when the first rotation speed exceeds a first rotation speed limit, the control device performs the write power calibration on the second power calibration area, and otherwise, the control device performs the write power calibration on the first power calibration area.

6. The optical disc access system as claimed in claim 5, wherein the first rotation speed limit is the highest rotation speed of the optical disc for the write power calibration to be properly performed on the first power calibration area.

7. The optical disc access system as claimed in claim 5, wherein the second power calibration area is implemented in a last possible Lead-Out Area of the outer area of the optical disc.

8. The optical disc access system as claimed in claim 7, wherein the last possible Lead-Out Area is located in the outer edge of the optical disc to record a data-end message of the optical disc.

9. A method for determining a write power of a readable/writable optical disc using an optical disc access system, the readable/writable optical disc having a data record area, a first power calibration area and a second power calibration area, the first power calibration area and the second power calibration area respectively formed on the inner area and the outer area of the readable/writable optical disc, the data record area formed between the first power calibration area and the second power calibration area, the method comprising the steps of:
    choosing a data writing speed to the optical disc access system in order to write a predetermined amount of data in the data record area within a unit of time, wherein the unit of time is machine-dependent;
    calculating a first rotation speed according to the data writing speed such that the optical disc access system writes the predetermined amount of data in the first power calibration area within the unit of time when the optical disc access system rotates the readable/writable optical disc at the first rotation speed;
    performing of a write power calibration on the first power calibration area by the optical disc access system when the first rotation speed does not exceed a first rotation speed limit; and otherwise
    performing of a write power calibration on the first power calibration area by the optical disc access system when the first rotation speed exceeds the first rotation speed limit.

10. The method as claimed in claim 9, wherein the first rotation speed limit is less than the highest rotation speed of a servomotor of the optical disc access system.

11. The method as claimed in claim 9, wherein the second power calibration area is implemented in a last possible Lead-Out Area of the outer area of the readable/writable optical disc.

12. The method as claimed in claim 11, wherein the last possible Lead-Out Area is located in the outer edge of the readable/writable optical disc to record a data-end message of the readable/writable optical disc.

* * * * *